Patented Mar. 1, 1938

2,109,491

UNITED STATES PATENT OFFICE 2,109,491

LUBRICANT

David Lipkin, Philadelphia, Pa., assignor to The Atlantic Refining Company, Philadelphia, Pa., a corporation of Pennsylvania No Drawing. Application December 28, 1935, Serial No. 56,539

10 Claims. (Cl. 87—9)

The present invention relates to the art of lubrication, and more particularly to the lubrication of surfaces engaging under extreme pressure, as for example, the rubbing surfaces of hypoid gears, free wheeling transmissions, speed reducers and the like.

The general tendency in the design of modern machinery has been toward a higher ratio between power and "dead weight". This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been thought that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps, sulfur or combined chlorine, possess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as, for example, iron sulfide or chloride is formed. It appears that such a film or plating has a low coefficient of friction and that satisfactory operation of heavily loaded bearings or gears depends upon the formation and maintenance of such a film, and not upon the retaining of a film of oil between the bearing surfaces.

The hydrocarbon oil constituents of an extreme pressure lubricant serves primarily to remove frictional heat, to wash away any solid particles which may result from wear, and to prevent oxidation of the engaging surfaces.

In my copending application Serial No. 15,097, filed April 6, 1935, I have disclosed the addition of phosphonitrilic halides to hydrocarbon oils to improve the load-bearing capacity and other properties thereof.

I have now discovered that compounds produced by the reaction or condensation of the phosphonitrilic halides with organic compounds containing preferably at least one reactive hydrogen atom, such as alcohols, phenols, mercaptans and amines, when admixed with hydrocarbon oils, are of special utility in the field of extreme pressure lubrication. The reaction or condensation products which may be employed in accordance with my invention include those resulting from the condensation of the phosphonitrilic halides, and particularly the phosphonitrilic chlorides, with aliphatic, aromatic, hydroaromatic, or heterocyclic alcohols, mercaptans, amines, halogenated hydrocarbons, or other compounds containing functions capable of reaction or condensation with the phosphonitrilic halides.

The phosphonitrilic halides, and particularly the chlorides, which I employ in my condensation reaction with various organic compounds, are shown in the following table.

| Compound | Melting point | Boiling point | |
|---|---|---|---|
| | | 13 m/m | 760 m/m |
| | ° C. | | |
| $(PNCl_2)_3$ | 114.0 | 127° C. | 256.5° C. |
| $(PNCl_2)_4$ | 123.5 | 188° C. | 328.5° C. |
| $(PNCl_2)_5$ | 41.0 | 224° C. | Polymerizes. |
| $(PNCl_2)_6$ | 90.0 | 262° C. | Do. |
| $(PNCl_2)_7$ | Below −18 | 291° C. | Do. |
| $(PNCl_2)_x$ | Below 500 | Depolymerizes on distillation. | |

These halides are soluble in the common organic solvents and hydrocarbon oils, and may be steam-distilled, or boiled with acids or alkalis, without substantial decomposition. Upon heating to temperatures of the order of 250° C. to 350° C. each member of the series polymerizes to form high molecular weight, elastic, rubber-like compounds which are designated by the formula $(PNCl_2)_n$. At temperatures in excess of about 350° C. depolymerization of the high molecular weight compounds occurs, with the formation of the lower molecular weight halides.

Among the organic compounds which I may employ in my condensation reactions may be mentioned the hydroxy compounds such as methyl alcohol and its homologues; phenol; cresol; xylenols; naphthols; benzyl alcohol; cyclohexanol; furfuryl alcohol; hydroxy pyridine and the like. The mercaptan compounds are represented by methyl mercaptan and its homologues; thiophenol; thionaphthols; benzyl mercaptan; pyridyl mercaptan; and cyclohexyl mercaptan. The amino compounds include methylamine and its homologues; aniline; toluidine; benzylamine; methylaniline; cyclohexylamine; furfurylamine; piperdine, and other substituted ammonias containing at least one reactive hydrogen atom, such as phenylhydrazine. The halogenated hydrocarbons may be represented by methyl chloride and its homologues; chloro- or bromobenzene and their homologues; chloro-cyclohexane; and the chloro-naphthalenes. Other halogenated compounds which may be suitably employed include the halogenated furanes; halogenated pyridine; halogenated quinoline; and the various halogenated alcohols, phenols, amines, mercaptans and the like.

The condensation reactions, when employing, for example $(PNCl_2)_3$ and a hydroxy compound, an amino compound, and a mercaptan, respectively, may be represented by the following equations:

(1) $(PNCl_2)_3 + 6\ ROH \rightarrow [(RO)_2PN]_3 + 6\ HCl$
(2) $(PNCl_2)_3 + 6\ RNH_2 \rightarrow [(RNH)_2PN]_3 + 6\ HCl$
(3) $(PNCl_2)_3 + 6\ RSH \rightarrow [(RS)_2PN]_3 + 6\ HCl$ In the above reaction "R" may be either an aliphatic, hydroaromatic, aromatic or heterocyclic radical. Furthermore, the reactions may be carried on in the presence or absence of catalysts, and it is not always necessary to employ sufficient of the hydroxy, amino or mercaptan compound to react completely with the phosphonitrilic halide, since in some instances it may be desirable to retain a certain amount of the halogen in the condensation product.

In preparing my lubricant, I add to a suitable mineral oil one or a mixture of two or more of my condensation products in quantity sufficient to improve the lubricating value of the oil to any desired extent, depending upon the operating conditions under which the lubricant is to be used. I have found that the quantity of condensation product, in general, does not exceed substantially 10% by weight of my composition. Quantities as small as 3%, or even 1% or less, in certain instances, have been found to improve lubricating oils to a satisfactory extent. In preparing my lubricant, I may obtain a homogeneous solution of condensation product in mineral oil by agitating the mixture at normal or elevated temperatures, or I may dissolve the condensation product in a suitable solvent and add the resulting solution to the oil, thereafter removing the solvent by vaporization.

Typical examples of my improved lubricant and methods of preparing the same are as follows:

*Example 1*

10 parts by weight of phosphonitrilic chloride, comprising substantially $(PNCl_2)_3$ and $(PNCl_2)_4$, was admixed with 16.2 parts by weight of phenol dissolved in a slight excess of 15% sodium hydroxide solution, and the mixture was refluxed at about 110° C. for about 40 hours. The mixture, after refluxing, was cooled and the aqueous caustic solution was separated from the reaction product, which was thereafter water washed. The washed product was then dissolved in ether, the solution dried over $CaCl_2$, and then distilled under reduced pressure to remove the ether and unreacted phenol. The distillation residue, consisting principally of the polymers of diphenyl metaphosphimate $[(C_6H_5O)_2PN]_n$, wherein "$n$" may be from 3 to 7, was dissolved in ether, sufficient of the ether solution was added to a hydrocarbon oil to give a concentration of about 1% by weight of the condensation product in the oil, and the ether was removed therefrom by vaporization. The hydrocarbon oil employed had a viscosity of 304 seconds Saybolt universal at 100° F., and an A. P. I. gravity of 29.5° at 60° F. This oil when tested in an Almen extreme pressure lubricant testing machine at 200 R. P. M., withstood a pressure of only 4,000 lbs./sq. in. projected bearing area before failure, whereas the oil containing 1% of my condensation product withstood a pressure of 22,000 lbs./sq. in.

*Example 2*

7.6 parts by weight of phosphonitrilic chloride, comprising substantially $(PNCl_2)_3$ and $(PNCl_2)_4$, was admixed with 16.1 parts by weight of orthocresol, and the mixture was refluxed at a temperature of from 186° C. to 309° C., in the presence of a small quantity of MgO and metallic copper, for a period of about 97 hours. The reaction product was then steam-distilled to remove therefrom any unreacted cresol and the distillation residue was warmed with aqueous alkali solution to remove any acidic material. The acid-free product was then water-washed, taken up in ether and dried over anhydrous $Na_2SO_4$. Sufficient of the ether solution of the condensation product, i. e., the polymers of di-ortho-cresyl metaphosphimate, was added to the same hydrocarbon oil as employed in Example 1 to give a concentration of about 1% by weight of the condensation product in the oil, and the ether was thereafter removed by vaporization. This blended oil, when tested under the conditions as set forth in Example 1, withstood a pressure of 19,000 lbs./sq. in. projected bearing area, whereas the hydrocarbon oil alone sustained a pressure of only 4,000 lbs./sq. in. before failure.

*Example 3*

7.1 parts by weight of phosphonitrilic chloride, comprising substantially $(PNCl_2)_3$ and $(PNCl_2)_4$, was admixed with 14.8 parts by weight of orthocresol dissolved in a slight excess of 15% sodium hydroxide solution, and the mixture was refluxed at about 110° C. for about 9 hours. After completion of the refluxing, the reaction product was acidified with HCl and then steam-distilled to remove any unreacted ortho-cresol. The distillation residue was dissolved in ether, the ether solution filtered, and the filtrate dried over anhydrous $Na_2SO_4$. Sufficient of the ether solution of the condensation product was added to the same hydrocarbon oil as employed in Example 1 to give a concentration of about 1% by weight of the condensation product in the oil, and the ether was removed therefrom by vaporization. This blended oil, when tested under the conditions set forth in Example 1, withstood a pressure of 22,000 lbs./sq. in. projected bearing area, whereas the hydrocarbon oil alone withstood a pressure of only 4,000 lbs./sq. in. before failure.

Example 4

3.9 parts by weight of metallic potassium was dissolved in an excess of anhydrous n-butyl alcohol and 5.8 parts by weight of phosphonitrilic chloride, comprising substantially (PNCl₂)₃ and (PNCl₂)₄ in anhydrous butyl alcohol, was added thereto and the mixture refluxed at about 100° C. to about 117° C. for about 13 hours. After refluxing, the reaction product was filtered, and the filtrate subjected to distillation under reduced pressure to remove the excess n-butyl alcohol. The distillation residue, consisting principally of the polymers of dibutyl metaphosphimate $$[(C_4H_9O)_2PN]_n,$$

was added to the same hydrocarbon oil as employed in Example 1 to give a concentration of about 2% by weight of the condensation product in the oil. This blended oil, when tested under the conditions set forth in Example 1, withstood a pressure of 22,000 lbs./sq. in. projected bearing area, whereas the hydrocarbon oil alone sustained a pressure of only 4,000 lbs./sq. in. before failure.

Example 5

3.9 parts by weight of metallic potassium was added to a solution of 13.5 parts by weight of n-butyl mercaptan dissolved in anhydrous tertiary butyl alcohol. To this solution was added 5.8 parts by weight of phosphonitrilic chloride, comprising substantially (PNCl₂)₃ and (PNCl₂)₄, in solution in tertiary butyl alcohol. This mixture was refluxed, in an atmosphere of nitrogen, at a temperature of about 85° C. for about 13 hours. After refluxing was completed, the reaction product was filtered and the filtrate was distilled under reduced pressure to remove the tertiary butyl alcohol, any unreacted butyl mercaptan, and any butyl disulfide which may have been formed. The distillation residue, consisting principally of the polymers of dibutyl thiometaphosphimate $[(C_4H_9S)_2PN]_n$, was added to the same hydrocarbon oil as employed in Example 1, to give a concentration of about 1% by weight of the condensation product in the oil. This blended oil, when tested under the conditions set forth in Example 1, withstood a pressure of 16,000 lbs./sq. in. projected bearing area, whereas the hydrocarbon oil alone sustained a pressure of only 4,000 lbs./sq. in. before failure.

Example 6

5.8 parts by weight of phosphonitrilic chloride, comprising substantially (PNCl₂)₃ and (PNCl₂)₄, was dissolved in anhydrous benzene. To this solution was added 16.4 parts by weight of n-butylamine and the mixture was refluxed at about 80° C. for about 5 hours. After refluxing was completed, the reaction product was filtered and the filtrate was distilled under reduced pressure to remove the benzene. The distillation residue, consisting principally of the polymers of N, N'-dibutyl-metaphosphimamide $$[(C_4H_9NH)_2PN]_n,$$

was added to the same oil as employed in Example 1 to give a concentration of about 2% by weight of the condensation product in the oil. This blended oil, when tested under the conditions set forth in Example 1, withstood a pressure of 20,000 lbs./sq. in. projected bearing area, whereas the hydrocarbon oil alone withstood a pressure of only 4,000 lbs./sq. in. before failure.

Example 7

11.6 parts by weight of phosphonitrilic chloride, comprising substantially (PNCl₂)₃ and (PNCl₂)₄, was dissolved in ether and this solution was added, with stirring, to 59.1 parts by weight of butyl magnesium iodide (C₄H₉MgI) in ether solution. This mixture was refluxed on a water-bath for about 4 hours and then poured into ice water to decompose the excess butyl magnesium iodide. The water-ether mixture was then filtered to remove Mg(OH)₂, the filtrate was saturated with sodium chloride, and the ether solution was separated from the aqueous solution. The ether solution of the condensation product was dried over anhydrous CaSO₄, and the dried solution was distilled to remove the ether. The distillation residue, consisting principally of the polymers of dibutyl phosphine nitride $[(C_4H_9)_2PN]_n$, was added to the same oil as employed in Example 1, to give a concentration of about 1% by weight of the condensation product in the oil. This blended oil, when tested under the conditions as set forth in Example 1, withstood a pressure of 22,000 lbs./sq. in. projected area, whereas the hydrocarbon oil alone withstood a pressure of only 4,000 lbs./sq. in. before failure.

Example 8

5.8 parts by weight of phosphonitrilic chloride, comprising substantially (PNCl₂)₃ and (PNCl₂)₄, was admixed with 19.4 parts by weight of aniline and the mixture was heated at about 100° C. for about 7 hours. At the completion of the heating period, the reaction product was treated with dilute HCl and filtered to remove any excess aniline as aniline hydrochloride. The treated reaction product was then water washed, dried and then extracted with ether by refluxing. The ether solution was cooled and filtered, and the ether removed from the filtrate by vaporization. After removal of the ether, sufficient of the condensation product, consisting principally of the polymers of N, N'-diphenyl metaphosphimamide $[(C_6H_5NH)_2PN]_n$, was added to the same hydrocarbon oil as employed in Example 1 to give a concentration of about 1% by weight of the condensation product in the oil. This blended oil, when tested under the conditions set forth in Example 1, withstood a pressure of 19,000 lbs./sq. in. projected bearing area, whereas the hydrocarbon oil alone withstood a pressure of only 4,000 lbs./sq. in. before failure.

It will be seen, from the above examples, that the addition of a condensation product of a phosphonitrilic halide with an organic compound to a mineral oil improves the lubricating value of such an oil to a marked extent, and imparts to the oil certain properties which render it suitable for use in the lubrication of surfaces engaging under extreme pressure. In the formulae for the condensation products of the above examples, subscript "n" usually ranges from 3 to 7, depending upon the phosphonitrilic halide employed and the temperature required to effect the desired reaction. When the phosphonitrilic halide comprises essentially (PNCl₂)₃ or (PNCl₂)₄, and the reaction temperatures are relatively low, the subscript "n" of the resulting condensation product will, in general, have a value of 3 or 4. However, when higher reaction temperatures are required, the condensation products will contain higher polymers and the subscript "n" may have a value up to 7 and even higher, particularly when very high molecular weight condensation products are formed.

Furthermore, I have found that organic compounds having long hydrocarbon chains or substituted hydrocarbon chains, when condensed with phosphonitrilic halides, are capable of not only improving the load-bearing capacity of hydrocarbon oils but also effect a lowering of the coefficient of friction, or improve the "oiliness" of the lubricant. The condensation products obtained from long chain compounds such as cetyl, lauryl, dodecyl and oleyl alcohols and the substitution products thereof, are representative examples of this type of materials.

While I have described my invention with reference to the lubrication of gears and bearings operating under heavy loads, I do not intend to limit myself thereto, but contemplate the use of my lubricant in operations such as the cutting and boring of metals, in which conditions of extreme pressure and temperature are normally encountered, and also in the lubrication of mechanisms operating under moderate pressures, as for example, the crankcase bearings and cylinder walls of internal combustion engines. Furthermore, my compounded oil may be utilized as a base in the preparation of thickened oils, i. e., greases, by the addition thereto of soaps or other conventional thickening agents, whereby to obtain lubricants of desired viscosity. My compounded oil may also be blended with fatty oils, fatty acids, synthetic esters and the like, or the condensation products alone may be admixed with fatty oils, for the lubrication of mechanisms in which the presence of a fatty oil is desirable.

Herein and in the appended claims the term "phosphonitrilic halide" is to be understood to comprehend one or a mixture of phosphonitrilic chlorides, bromides, iodides and fluorides.

What I claim is:

1. A lubricant comprising a hydrocarbon oil and a condensation product of a phosphonitrilic halide with an organic compound.

2. A lubricant comprising a hydrocarbon oil and less than substantially 10% of a condensation product of a phosphonitrilic halide with an organic compound.

3. A lubricant comprising a hydrocarbon oil and less than substantially 3% of a condensation product of a phosphonitrilic halide with an organic compound.

4. A lubricant comprising a hydrocarbon oil and less than substantially 1% of a condensation product of a phosphonitrilic halide with an organic compound.

5. A lubricant comprising a hydrocarbon oil and a condensation product of a phosphonitrilic chloride with an organic compound containing at least one reactive hydrogen atom.

6. A lubricant comprising a hydrocarbon oil and a condensation product of a phosphonitrilic halide with a halogenated organic compound containing at least one reactive hydrogen atom.

7. A lubricant comprising a hydrocarbon oil and a condensation product of a phosphonitrilic halide with an organic compound containing a substituent from the group comprising —OH, —SH, —NH$_2$, —NH— and halogen.

8. A lubricant comprising a hydrocarbon oil and a condensation product of a phosphonitrilic chloride with an organic compound containing a substituent from the group comprising —OH, —SH, —NH$_2$, —NH— and halogen.

9. A lubricant comprising a hydrocarbon oil and at least one compound from the group of organic phosphorus-nitrogen containing compounds consisting of phosphimates, phosphimamides and phosphine nitrides.

10. The method of reducing the friction between relatively moving metallic surfaces which comprises maintaining therebetween a film of lubricating oil and at the same time chemically acting upon such surfaces by means of a condensation product of a phosphonitrilic halide with an organic compound containing at least one reactive hydrogen atom, said condensation product being present in said film in relatively small amounts.

DAVID LIPKIN.